United States Patent
Gotoh

Patent Number: 5,015,134
Date of Patent: May 14, 1991

[54] TAPPING SCREW
[75] Inventor: Isamu Gotoh, Osaka, Japan
[73] Assignee: Yamaki Sangyo Co., Ltd., Osaka, Japan
[21] Appl. No.: 486,654
[22] Filed: Mar. 1, 1990
[30] Foreign Application Priority Data Sep. 12, 1989 [JP] Japan .................. 1-107117[U]

[51] Int. Cl.$^5$ ............................................ F16B 25/00
[52] U.S. Cl. ................................ 411/386; 411/413; 411/399
[58] Field of Search .............. 411/411, 412, 413, 386, 411/387, 426, 409, 399

[56] References Cited
U.S. PATENT DOCUMENTS

| 373,074 | 11/1887 | Jones | 411/386 |
| 1,396,455 | 11/1921 | Moore | 411/411 |
| 2,403,359 | 7/1946 | Gerhold | 411/387 |
| 3,524,378 | 8/1970 | Weiber | 411/387 |
| 4,653,244 | 3/1987 | Farrell | 411/412 |
| 4,834,602 | 5/1989 | Takasaki | 411/386 |
| 4,874,278 | 10/1989 | Kawashita | 411/386 |

Primary Examiner—Rodney M. Lindsey
Assistant Examiner—Jerry Redman
Attorney, Agent, or Firm—Wenderoth, Lind & Ponack

[57] ABSTRACT

A tapping screw having a shank having a head and a tapered tip portion. The shank is formed on its peripheral surface with threads. First and second drill edges are formed on the tapered portion and on the intermediate portion between the head and an tapered portion, respectively, so as to be independent of the threads. The first drill edge has a maximum diameter smaller than that of the threads in the rear thereof and the second one has a maximum diameter equal to or larger than that of the threads on the main portion of the shank.

12 Claims, 1 Drawing Sheet

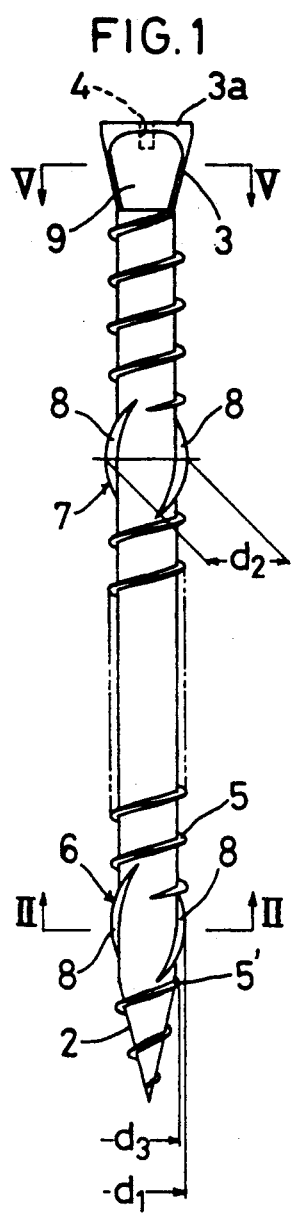
FIG. 1
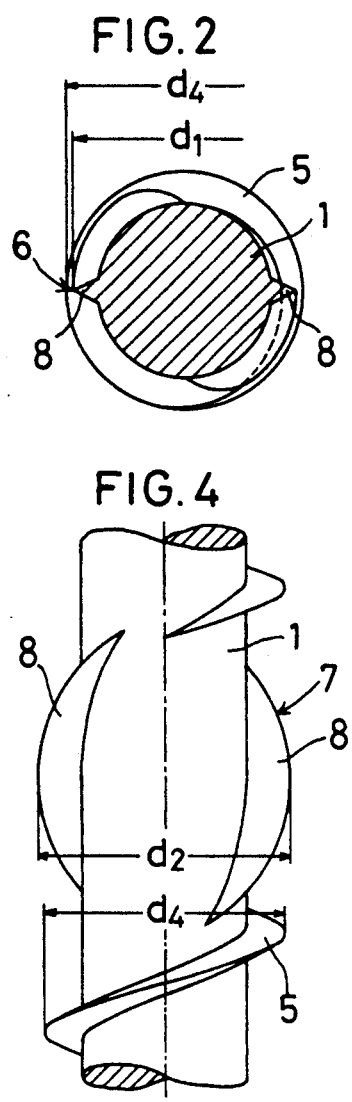
FIG. 2
FIG. 4
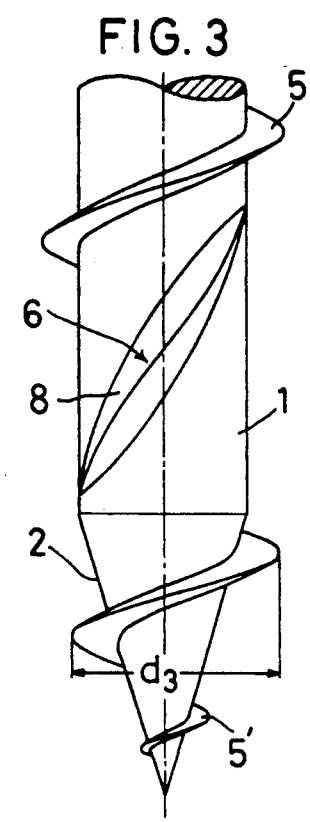
FIG. 3
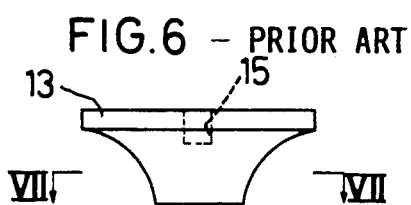
FIG. 6 – PRIOR ART
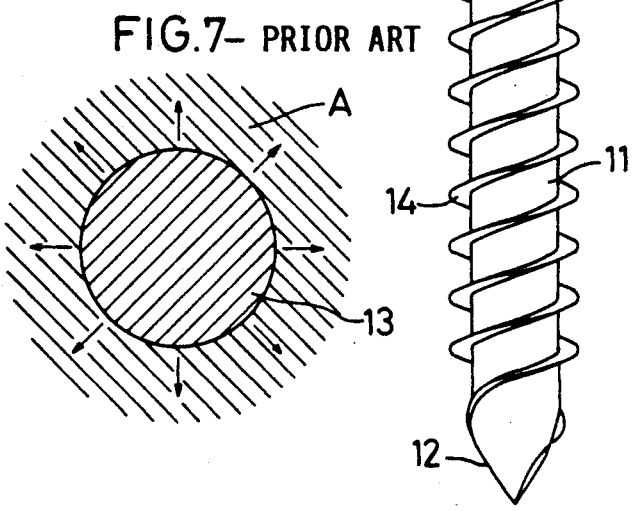
FIG. 7 – PRIOR ART
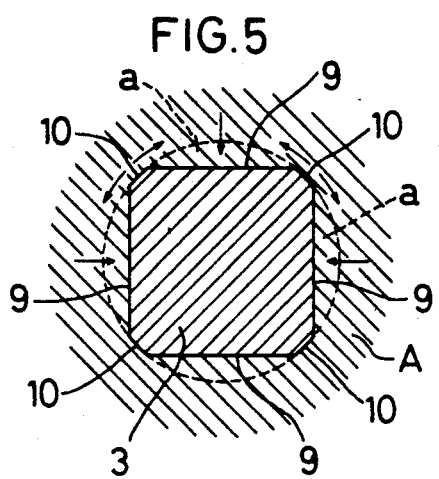
FIG. 5

TAPPING SCREW

BACKGROUND OF THE INVENTION

The invention relates to a tapping screw adapted to be screwed into a mounting surface of wood or the like while forming threads therein and more specifically a tapping screw having a structure for preventing cracks from being formed on the mounting surface when the screw is driven in.

FIG. 6 shows a prior art tapping screw which comprises a shank 11 having a tapered tip 12 and a head 13 formed integrally with the rear end of the shank and having a larger diameter than that of the shank 11. The latter is formed on its entire peripheral surface with threads 14.

The head 13 of this tapping screw has such a shape as to expand from the shank 11 to form a conical shape. In use, the screw is usually screwed into a mounting surface until its head 13 sinks below the surface.

But the tapping screw having such a structure has a drawback that because the threads 14 on the shank 11 have the same diameter and the same lead angle, when the shank is screwed in up to its rear end, a considerable amount of heat tends to be produced as the contact length of threads increases. This may cause the seizure of threads.

Also, when the screw is driven in until its head 13 sinks below the mounting surface, the mounting member A will be forcibly expanded radially by the head 13 as shown in FIG. 7. This may result in the development of cracks in the mounting member. Cracks are more likely to develop if the mounting member is a hard wood.

To prevent such cracks, it is necessary to reduce the stress which acts on the mounting member by reducing the size of the head. But because it is necessary to form a groove 15 for a screw driver in the head 13, its shape is limited and its size cannot be reduced below a given point.

One prior art tapping screw has its head tapered moderately into a conical shape in order to reduce changes in the stress which acts on the mounting member. But the eventual deformation resulting from the penetration of the head is the same as with other prior art screws. Thus if the mounting member is a hard wood, such a shape is of no advantage and cracks will develop as with other prior art screws.

SUMMARY OF THE INVENTION

It is an object of the present invention to provide a tapping screw which can be reliably screwed even into a hard mounting member without the fear of developing cracks in the mounting surface.

In accordance with the present invention, there is provided a tapping screw having a shank having a main portion, a tapered portion at its tip and a head having a larger diameter than that of the shank, the shank being formed on the outer peripheral surface thereof with threads. The invention is characterized in that the shank is formed on the tapered portion with a drill edge having a maximum diameter smaller than the maximum diameter of the threads formed in the rear thereof. The head has its portion at the side of the shank shaped into a pyramid so as to expand rearwardly from the shank.

With the tapping screw according to the present invention, after the threads on the tapered portion bite into the mounting member, the drill edge chips off the threaded hole tapped by the tapered portion. The threads on the main portion of the shank bite into the thus formed starting hole.

By chipping off the starting hole by the drill edges, the length of tapping by the follow-on threads on the shank can be reduced. This will in turn reduce the quantity of heat produced in the threads.

When the screw is driven in up to its head, the mounting member A is initially expanded so as to comply with the sectional shape of the pyramid (square pyramid in the example shown). But thereafter it shrinks in such a manner as to fill gaps defined between the planes and the corners forming the pyramid. Thus the mounting member A deforms at its contact area with the corners of the pyramid, thus allowing the strain to be released toward the planes at both sides. This will considerably relax the concentration of stress and thus prevent cracks.

In contrast, in the case of the prior art conical-headed screw, the mounting member is expanded uniformly over the whole periphery of the conical head. Since there is no place to release the strain, the stress in the mounting member will increase. Thus cracks will develop.

A rear drill edge may be provided besides the drill edge on the tapered portion in order to drill the threaded hole again. This will not only make subsequent screwing smoother but also facilitate pushing in the head.

Other features and objects of the present invention will become apparent from the following description taken with reference to the accompanying drawings, in which:

BRIEF DESCRIPTION OF THE DRAWINGS

FIG. 1 is a front view of the tapping screw embodying the present invention;

FIG. 2 is a sectional view taken along line II—II of FIG. 1;

FIGS. 3 and 4 are enlarged views of portions of the tapping screw shown in FIG. 1;

FIG. 5 is a sectional view taken along line V—V of FIG. 1;

FIG. 6 is a front view; of a prior art tapping screw and

FIG. 7 is a sectional view taken along line VII—VII of FIG. 6.

DETAILED DESCRIPTION OF THE PREFERRED EMBODIMENT

The embodiment of this invention will be described below with reference to the accompanying drawings.

As shown in FIG. 1, the tapping screw of the preferred embodiment comprises a shank 1 having a conical tapered portion 2 at its tip and a head 3 integrally formed on the rear end of the shank 1. On the rear end surface 3a of the head 3, a driver groove 4 in the shape of either a "+" or a "−" is formed.

Threads 5' are formed on the peripheral surface of the tapered portion 2 of the shank 1, whereas threads 5 having the same lead angle as the threads 5' are formed on the peripheral surface of the shank 1 to extend from the tapered portion 2 to the head 3. Drill edges 6 and 7 are formed on the peripheral surface of the shank at the tapered portion 2 and at an intermediate portion between the tapered portion 2 and the head 3, respectively, so as to be independent of the threads 5 and 5'.

As shown in FIGS. 2 to 4, each of the drill edges 6 and 7 is in the form of two ribs 8 arranged in diametrically opposite positions relative to each other and extend helically with a larger lead angle than that of the threads 5 and 5'. The section of the ribs 8 transverse to the axis thereof is in the shape of a triangle having an apex angle of about 60 degrees. They have arcuate ridge lines extending along the direction of twist.

As shown in FIGS. 1 and 2, the maximum diameter d1 of the drill edge 6 is larger than the maximum diameter d3 of the threads 5' on the tapered portion 2 and smaller than the maximum diameter d4 of the threads 5 on the main portion of the shank (d3<d1<d4). On the other hand, as shown in FIG. 4, the drill edge 7 has a maximum diameter d2 equal to or larger than the maximum diameter of the threads 5 on the main portion of the shank (d2≧d4). The upper limit by which the maximum diameter d2 of the drill edges 7 exceeds the maximum diameter d4 of the threads 5 should be set at about 0.15 mm.

The length of the drill edges 6 and 7 should be determined according to the diameter of the screw. But ordinarily, the drill edge 6 should have a length substantially equal to the longitudinal distance of three turns of the threads 5' and the drill edge 7 should have a length substantially equal to the longitudinal distance of two turns of the threads 5.

As shown in FIG. 1, the head 3 has a neck portion it connecting to the shank 1 and having a square pyramidical shape expanding from the shank 1 rearwardly. As shown in FIG. 5, the section of the square pyramidical portion in a direction perpendicular to the axis of the screw has such a shape that the respective opposite planes 9 of the square pyramidical portion are parallel to each other and the corners 10 formed by the adjacent planes 9 are rounded off. The head 3 has a circular section at a portion near its rear end face 3a formed with a driver groove 4.

Next the operation of the tapping screw of this embodiment will be described.

As the tapping screw is driven into a mounting member such as wood, the tapered portion 2 will bite thereinto along the threads 5'. Then the drill edges 6 will helically chip off the sidewalls of the threaded hole thus tapped to drill it, and the threads 5 to the rear of the drill edge 6 will bite into the starting hole thus drilled.

Since the circumferential length of tapping by the threads 5' decreases by the length of the grooves drilled by the drill edges 6, biting will be possible with a smaller torque. Also because the quantity of heat produced reduces, seazure will be prevented. Further, the grooves cut by the drill edges 6 serve to discharge powdery matter produced by tapping, thus preventing clogging with powdery matter.

When the screw is further thrusted in and the drill edge 7 bites into the mounting member, it will helically drill the threaded hole formed by tapping. The threads 5 on the rear end of the shank 1 will bite into the starting hole formed by drilling with the drill edge 7. By the provision of the drill edge 7 on the shank at its intermediate portion, the threaded hole can be rewidened. This makes smooth the tapping by the rear end of the shank. Also the head 3 can be more easily thrust into the hole because the starting hole is widened.

Since the threaded hole is widened when drilled by the drill edge 7, the threads 5 on the rear end of the shank might not be able to bite with so strong a force. But since the threads 5' and 5 in front of the drill edge 7 firmly bite the mounting member, the holding force by the screw is kept high.

After the shank 1 has been screwed in, the head 3 will be pushed into the threaded hole tapped by the threads 5. At this time, the screw is presumed to operate as follows.

Namely, as shown in FIG. 5, when the head 3 is thrust in while turning, the mounting member A is expanded by the corners 10 of the square pyramid. But thereafter it will shrink by the resilience of wood or the like so as to fill the spaces a between the corners 10 and the planes 9. Then the mounting member A will be expanded by the next corner 10 as the screw turns and it will shrink again. It is thus gradually expanded as the shrinkage and expansion are repeated. When the head 3 is inserted completely, only the portions in contact with the corners 10 of the square pyramid are subjected to deformation and strain. But the other part will expand back to their previous state after the deformation and there is substantially no strain. Thus the strain in the regions near the corners is released to both sides and the overall strain is reduced. This will reduce the stress in the mounting member A and thus prevent cracks.

In the above case, by rounding off the corners 10 of the square pyramid, the concentration of stress can be reduced and thus cracks can be prevented.

When the screw is driven in until its head 3 is inserted completely, the head 3 is fixed in position because the spaces a formed on the planes 9 of the square pyramid are filled by the mounting member. Further the drill edges 6 and 7 biting into the mounting member provide major resistance to such a force as may pull out the screw. This will completely prevent the screw from being pulled out once it is driven in.

In the preferred embodiment, the head 3 has a square pyramidical shape but it may be in the shape of a triangular pyramid or a pentagonal pyramid.

A plurality of drill edges 7 may be provided on the rear part of the shank. But they should be provided near the head 3 so that the tapped hole will not widen too early to provide sufficient bite for the threads 5.

The threads to the rear of the drill edges 7 may be of a greater diameter than the drill edges 7 and the threads in front thereof so that the threads can bite into the mounting member securely over the whole length of the screw.

The tapping screw shown in FIG. 1 may be used to fix a composite material such as a ceramic siding panel to wood. For example, in forming a wall of a house, this tapping screw may be used to secure a ceramic siding panel as a wall body to a wood wall surface. When the tapping screw is driven in from outside the wall body, the drill edges 6 and 7 will drill the wall body of siding panel, thus expanding the threaded hole. This allows the head to penetrate easily. Thus the shock to the wall body when the screw is driven in up to its head is reduced. This will effectively prevent cracks on the wall body. In the above case, the threads 5 and 5' in front of the drill edges 7 are screwed into the wood, thus allowing the tapping screw to firmly bite into the mounting surface without the fear of being pulled out.

What is claimed is:

1. A tapping screw comprising:
   a shank having a front portion including a tapered portion at a front tip thereof and a rear portion;
   a substantially pyramidically shaped head integrally connected with a rear end of said shank, said head having a cross sectional area which is substantially equal to a cross sectional area of said shank at a location where said head and said shank connect, said cross sectional area of said head gradually increasing toward a rear end of said head;

a first drill edge formed on an outer peripheral surface of said front portion of said shank; and helical threads formed along said shank on an outer peripheral surface thereof with threads formed rearwardly of said first drill edge having a maximum diameter which is smaller than a maximum diameter of said first drill edge.

2. A tapping screw as recited in claim 1, wherein said substantially pyramidically shaped head has a substantially square cross section.

3. A tapping screw as recited in claim 2, wherein said substantially square cross section has rounded-off corners.

4. A tapping screw as recited in claim 3, further comprising a second drill edge formed on an outer peripheral surface of said shank between said first drill edge and said head and having a maximum diameter which is greater than or equal to a maximum diameter of threads formed on said shank forwardly of said second drill edge.

5. A tapping screw as recited in claim 4, wherein said maximum diameter of said second drill edge is also greater than or equal to a maximum diameter of threads formed on said shank rearwardly of said second drill edge.

6. A tapping screw as recited in claim 4, wherein said maximum diameter of said second drill edge is also greater than a maximum diameter of threads formed on said shank rearwardly of said second drill edge.

7. A tapping screw as recited in claim 4, wherein said second drill edge comprises helical ribs having a larger lead angle than said helical threads.

8. A tapping screw as recited in claim 7, wherein said first drill edge comprises helical ribs having a larger lead angle than said helical threads.

9. A tapping screw as recited in claim 1, further comprising a second drill edge formed on an outer peripheral surface of said shank between said first drill edge and said head and having a maximum diameter which is greater than or equal to a maximum diameter of threads formed on said shank forwardly of said second drill edge.

10. A tapping screw as recited in claim 9, wherein said maximum diameter of said second drill edge is also greater than or equal to a maximum diameter of threads formed on said shank rearwardly of said second drill edge.

11. A tapping screw as recited in claim 9, wherein said maximum diameter of said second drill edge is also greater than a maximum diameter of threads formed on said shank rearwardly of said second drill edge.

12. A tapping screw as recited in claim 1, wherein said first drill edge comprises helical ribs having a larger lead angle than said helical threads.

* * * * *